(12) United States Patent
Swamy

(10) Patent No.: US 8,605,469 B2
(45) Date of Patent: Dec. 10, 2013

(54) AC SIDE SOFT CHARGE CIRCUIT FOR VARIABLE FREQUENCY DRIVES

(75) Inventor: Mahesh Swamy, Gurnee, IL (US)

(73) Assignee: Yasakawa America, Inc., Waukegan, IL (US)

( * ) Notice: Subject to any disclaimer, the term of this patent is extended or adjusted under 35 U.S.C. 154(b) by 0 days.

(21) Appl. No.: 13/371,865

(22) Filed: Feb. 13, 2012

(65) Prior Publication Data

US 2013/0208515 A1    Aug. 15, 2013

(51) Int. Cl.
    *H02M 5/45*    (2006.01)
(52) U.S. Cl.
    USPC .................... 363/37; 363/34; 363/49; 363/50
(58) Field of Classification Search
    USPC ........... 363/34, 35, 37, 39, 40, 44, 45, 47, 48, 363/123–128, 131
    See application file for complete search history.

(56) References Cited

U.S. PATENT DOCUMENTS

| | | | |
|---|---|---|---|
| 3,568,021 A | 3/1971 | Turnbull | |
| 3,955,104 A * | 5/1976 | Dumas | 327/452 |
| 4,307,442 A | 12/1981 | Yano et al. | |
| 4,394,720 A | 7/1983 | Gabor | |
| 4,458,306 A | 7/1984 | Galloway et al. | |
| 4,521,840 A | 6/1985 | Hoadley | |
| 4,638,138 A | 1/1987 | Rosa et al. | |
| 4,652,985 A | 3/1987 | Bougle | |
| 4,685,042 A | 8/1987 | Severinsky | |
| 4,788,635 A | 11/1988 | Heinrich | |
| 4,967,333 A | 10/1990 | Callier et al. | |
| 5,075,838 A | 12/1991 | Schnetzka et al. | |
| 7,227,330 B2 | 6/2007 | Swamy et al. | |
| 7,336,052 B2 | 2/2008 | Grbovic | |
| 7,593,244 B2 | 9/2009 | Sodo et al. | |
| 7,830,036 B2 * | 11/2010 | Wei et al. | 307/31 |
| 2004/0095784 A1 | 5/2004 | Zhou | |
| 2008/0068870 A1 | 3/2008 | Eguchi et al. | |
| 2008/0246336 A1 | 10/2008 | Fishman et al. | |
| 2009/0237961 A1 | 9/2009 | Sakakibara et al. | |
| 2010/0172161 A1 | 7/2010 | Tallam et al. | |
| 2011/0007530 A1 | 1/2011 | Swamy et al. | |
| 2011/0038185 A1 | 2/2011 | Swamy et al. | |

FOREIGN PATENT DOCUMENTS

JP    2005-6419    1/2005

OTHER PUBLICATIONS

Wijenayake, Gilmore, Lukaszewski, Anderson & Waltersdorf, "Modeling and Analysis of Shared/Common DC Bus Operation of AC Drives (Part I)", IEEE Industry Application Society Annual Meeting, New Orleans, Louisiana, Oct. 5-9, 1997.

* cited by examiner

*Primary Examiner* — Bao Q Vu
*Assistant Examiner* — Carlos Rivera-Perez
(74) *Attorney, Agent, or Firm* — Wood, Phillips, Katz, Clark & Mortimer

(57) ABSTRACT

A voltage source inverter comprises a rectifier having an input for connection to a multi-phase AC power source and converting the AC power to DC power at an output. An inverter receives DC power and converts the DC power to AC power. A DC bus is connected between the rectifier circuit and the inverter circuit to provide a relatively fixed DC voltage for the inverter. A bus capacitor is across the DC bus. A soft charge circuit limits inrush current to the bus capacitor. The soft charge circuit comprises an input inductor for each phase connected between the rectifier input and the AC power source and a clamping circuit across each input inductor to limit DC bus voltage.

13 Claims, 6 Drawing Sheets

AC SIDE SOFT CHARGE CIRCUIT FOR VARIABLE FREQUENCY DRIVES

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD OF THE INVENTION

The present invention relates to variable frequency drives and, more particularly, to a soft charge circuit including a clamping circuit.

BACKGROUND

Variable Frequency Drives (VFDs) with diode rectifier front ends are typically equipped with a resistor-contactor arrangement to limit the inrush current into the DC bus capacitors, thereby providing a means for soft charging the DC bus capacitors. Because of the mechanical nature of the magnetic contactor typically used in VFDs, there exists a concern of reliability. In addition, during a brown out condition, typically the contactor remains closed and when the voltage recovers, the ensuing transient is often large enough to possibly cause unfavorable influence to surrounding components in the VFD. Many researchers and application engineers have thought about this problem but have not been able to resolve the dilemma in a cost effective manner.

AC to DC rectifiers are widely used to convert AC line electric power to DC power to be used by inverters (for motor, UPS, and other applications), DC/DC converters, and passive loads such as resistors. In any rectifier circuit, the AC line voltages are rectified and ripple of the rectified voltage is filtered using a parallel capacitor and occasionally a series inductor. This results in a fixed, i.e., ripple free, DC voltage.

Without appropriate pre-charge circuitry, the start-up transients can be harmful to the systems. If the AC line and/or the DC link filters do not have sufficient impedance, significant switching transients may occur upon closing a three-phase supply switch. A large current surge charges the capacitor and depending on the system impedance, the surge current can reach prohibitive levels. As a result, the rectifier switches and the filter components (inductors and DC bus capacitors) may fail due to the excessive current/voltage through them. The transients may also create electromagnetic interference that may interfere with other equipment in the power system and can lead to a catastrophic failure. Therefore, during start-up it is mandatory to establish a high impedance path between the large AC line voltages and the DC bus capacitor. This task can be accomplished by a pre-charge or soft charge circuit that is placed in series with the DC bus output of the rectifier. The main task of the soft charge circuit is to exhibit sufficiently high impedance during start-up and zero impedance during normal operation.

Known voltage source inverters (VSI) that have a large DC bus capacitor filter use a resistor-contactor arrangement to limit the inrush current into the capacitors, and thereby provide a means to soft-charge the DC bus capacitor $C_{DC}$, see FIG. 1(a). Because of the mechanical nature of the contactor, the reliability of the variable frequency drive (VFD) is adversely affected. Moreover, the time delay involved in the basic response of the contactor can result in an unfavorable sequence of events during a brown out condition. Given these facts, the soft-charge circuit is often considered to be the weakest part of an otherwise well designed VFD.

The typical prior art VFD system shown in FIG. 1(a) employs the soft charge circuit including a resistor $R_{SC}$ and a contactor switch MC connected in parallel. The resistor $R_{SC}$ is sized for the start-up charging transient while the contactor switch MC is sized for the normal operation. During start-up the contactor switch MC is open (not conducting) and it remains so until the DC bus capacitor voltage reaches a critical value (roughly near rated operating voltage). Once the critical voltage level is reached, then the contactor switch MC is closed, and the resistor $R_{SC}$ is by-passed.

The rectifier system of FIG. 1(a) exhibits high energy-efficiency because the contactor switch MC has very low conduction losses and the large pre-charge transients are limited to less harmful levels. If for any reason the input AC supply experiences a large dip either due to brown out condition or due to a large load being suddenly applied across the AC supply, there is a possibility that the soft-charge contactor does not open and remains closed. When the input AC supply recovers, the resulting surge current can be large and damage the input rectifiers, and the DC bus capacitor. When large current flows through the soft charge resistor during such events, the contacts can even melt and fuse together, rendering them useless for future use. Hence, by nature, this approach does not yield a highly reliable solution. Also, due to mechanical actuation, the mechanical contactor switch wear-out is rapid and inevitable. Therefore, the life of the contactor is limited and in general much shorter than most of the stationary electrical parts inside a rectifier system.

There have been suggestions of replacing the magnetic contactor MC in FIG. 1(a) with a semiconductor switch, as shown in FIG. 1(b). However, the semiconductor switch requires intelligent control logic circuitry and is associated with steady-state power loss.

Thyristor controlled rectifiers have been used in VFDs but the additional gate circuit adds cost and increases the component count, which reduces reliability. With one known topology, the input rectifiers are replaced by thyristors. The triggering angle of the thyristors is controlled in such a manner that the DC bus capacitor charges up smoothly with no inrush. When a brown out occurs, the thyristor angle is such that it provides the maximum output voltage possible, similar to a typical diode bridge. When the voltage recovers after a brown out condition, the difference between the peak value of the input voltage and the DC bus voltage is large enough to force the triggering angle to increase and thereby reduce the high inrush current. The technique, shown in FIG. 2, is well established and is used by some VFD manufacturers. However, this VFD needs six pack thyristor modules, which can be expensive, especially for small sizes due to low volume of production by semiconductor manufacturers. The VFD needs six gate-trigger circuits along with sensing and decision making logic (The trigger circuits along with the necessary logic occupy space and are expensive). The thyristors may cause a voltage notching effect if the regulated output voltage is lower than that achievable from the input ac source—this will require the use of input AC inductor that occupies space and is an added cost. Finally, gate drive and logic circuits reduce mean time between failures (MTBF) due to the increased component count in the VFD.

A second alternative topology uses a Magneto Resistive (MR) device that shows high resistance under the influence of large magnetic field and low resistance when the magnetic field resets to a lower level. The MR element could be connected in series with the DC bus capacitor to soft charge it at start up or during the recovery time after a brown out condition. The circuit configuration is shown in FIG. 3(a) and the conceptual schematic in FIG. 3(b).

More recently, two alternate techniques of soft charging the DC bus of a VFD have been proposed. The first of these two techniques pertains to a method known as two-stage charging method. This topology borrows the idea of a typical star-delta starter used in conventional 3-phase ac motors. The DC bus capacitor is charged as a "semiconverter" at start. Once the DC bus voltage reaches the steady state voltage dictated by the semiconverter, the full converter configuration is engaged, resulting in a second charge up period. Since the charging is carried out in two stages, the inrush current through the inductor, capacitor, and diode is well controlled with almost no stress. The switching from the semiconverter configuration to the full bridge configuration can either be dictated by level of DC bus voltage or by a timer. The topology shown in FIG. 4 and satisfies most of the target features discussed herein.

When AC power is applied to the circuit shown in FIG. 4, an inrush current begins to flow, assuming that the DC bus capacitor has no initial stored voltage. The inrush current is directed to flow into the dummy wye connected inductor through the blocking diode D, by maintaining the auxiliary switch SW1 in the OFF state. Since the impedance of the wye connected dummy inductor can be chosen, the charging time as well as the peak amplitude of charging current can be manipulated. Hence, the inrush current through the inductor, capacitor, and diode is well controlled with almost no stress. The switching from the semi-converter configuration to the full bridge configuration can either be dictated by level of DC bus voltage or by a timer. The value of the dummy inductor in FIG. 4 is chosen to be such that the resulting circulating current is about 0.01 pu of the rated current. Both these methods have been simulated and found to yield acceptable results.

When AC power is applied to the circuit shown in FIG. 5, an inrush current begins to flow, assuming that the DC bus capacitor has no initial stored voltage. The inrush current is divided into two distinct paths. The first path is through the resistor-thyristor (TH2) combination and the second path is through the DC bus inductor, $L_{DC}$. The current through the resistor-thyristor path is initially higher and quicker than that through $L_{DC}$ since the inductor delays the buildup of current. The DC bus capacitor $C_{DC}$ starts to charge, with the resistor-thyristor combination providing as much charging as possible. The second charging path, through $L_{DC}$, creates a resonant circuit. Due to the nature of LC circuit, the voltage across the DC bus capacitor $C_{DC}$ tends to increase over and above the peak value of the applied input AC voltage. At this time, the thyristor across $L_{DC}$, TH1, experiences a forward bias and turns ON. The turning ON of TH1, causes the voltage across the inductor $L_{DC}$ to start failing and eventually turns OFF thyristor TH2 in series with the assist resistor, by reverse biasing it. The inductor voltage linearly ramps to zero and is clamped by TH1. The voltage across the DC bus capacitor $C_{DC}$ stops increasing and eventually discharges into its discharge resistor to a level dictated by the input voltage condition.

The important aspect of the resistor-assist circuit cannot be overlooked since the charging current flowing through $L_{DC}$ is reduced due to the parallel resistor assist circuit. This reduces the stored energy in $L_{DC}$. It also lowers the saturation current requirement and makes the inductor physically smaller. Due to the LC nature of the circuit, the voltage across the capacitor $C_{DC}$ is still higher than the peak value of the input voltage. The clamping circuit consisting of TH1 assures that the DC bus voltage is clamped to an acceptable value. The circuit shown in FIG. 6 satisfies the target requirements discussed herein.

The present invention is directed to satisfying the requirements discussed above, in a novel and simple manner.

SUMMARY

As described herein, a variable frequency drive includes a soft charge circuit with a clamping circuit on the AC side.

Broadly, there is disclosed herein a voltage source inverter comprising a rectifier having an input for connection to a multi-phase AC power source and converting the AC power to DC power at an output. An inverter receives DC power and converts the DC power to AC power. A DC bus is connected between the rectifier circuit and the inverter circuit to provide a relatively fixed DC voltage for the inverter. A bus capacitor is across the DC bus. A soft charge circuit limits inrush current to the bus capacitor. The soft charge circuit comprises an input inductor for each phase connected between the rectifier input and the AC power source and a clamping circuit across each input inductor to limit DC bus voltage.

It is a feature that a resonant circuit is formed by one of the inductors and the bus capacitor.

It is another feature that flux in each input inductor resets every half cycle.

It is a further feature that each clamping circuit comprises an anti-parallel clamping thyristor connected across the input inductor. Each clamping circuit may further comprise series connected first and second resistors across the inductor and a junction of the first and second resistors is connected to a gate of the anti-parallel clamping thyristor. Each clamping circuit may further comprise a diode across the gate-cathode terminal of the anti-parallel clamping thyristor.

It is another feature that the rectifier circuit comprises a diode rectifier.

There is also disclosed herein a variable frequency drive comprising a diode rectifier receiving multiphase AC power from a source and converting the AC power to DC power. An inverter receives DC power and converts the DC power to AC power to drive a load. A DC bus is connected between the diode rectifier and the inverter to provide a relatively fixed DC voltage for the inverter. A bus capacitor is across the bus. A soft charge circuit limits inrush current to the bus capacitor. The soft charge circuit comprises an input inductor for each phase connected between the rectifier and the AC power source and a clamping circuit across each input inductor to limit DC bus voltage.

Other features and advantages will be apparent from a review of the entire specification, including the appended claims and drawings.

DETAILED DESCRIPTION

The system described herein moves a clamping circuit from the DC side to the AC side of a variable frequency drive (VFD), or the like. Doing so relieves the burden on the DC bus inductor that it should be constructed such that it does not saturate. Since the flux in the inductor on the AC side resets itself every half cycle, the requirement that the inductor should not saturate is not a critical requirement. However, it is always desirable to have an inductor that is small in size, and is a standard product that can be easily procured from the market and that has a higher level of saturation. The circuit disclosed herein meets these requirements along with the target features mentioned above.

Figure 1A:
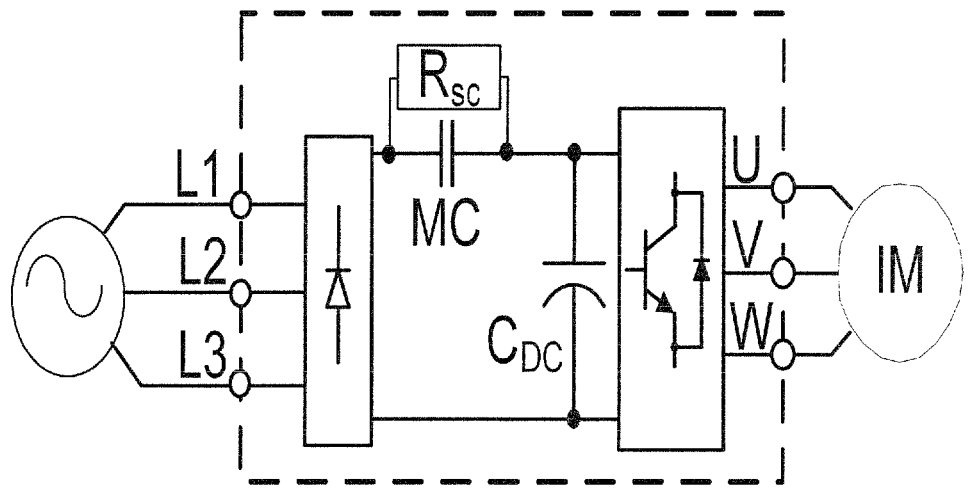
FIGS. 1(a), 1(b), 2 and 3(a) are generalized schematics of prior art variable frequency drives discussed above.
Figure 1B:
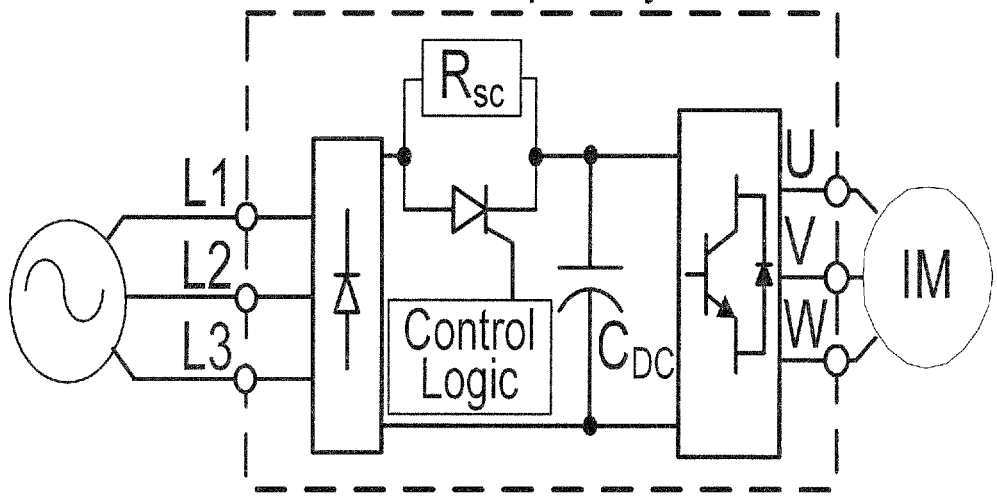
Figure 2:
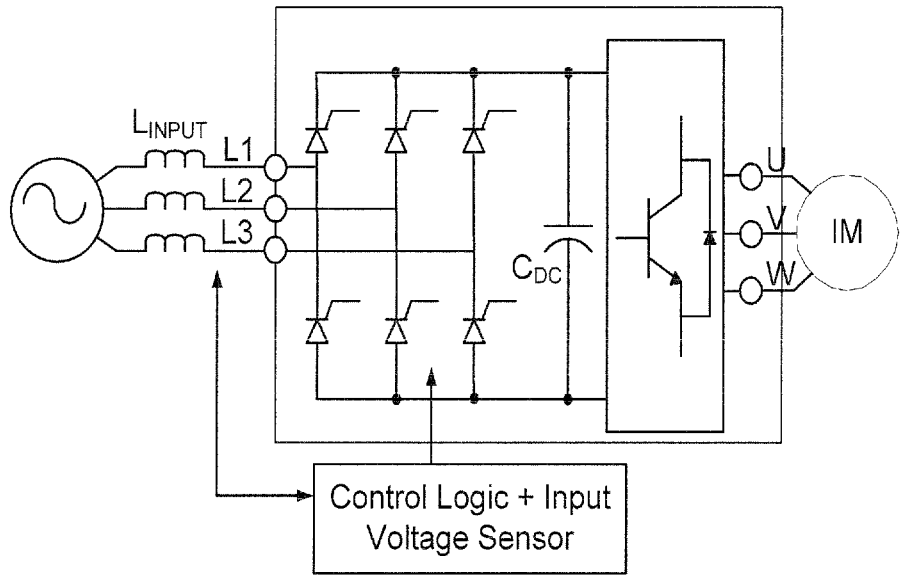
Figure 3:
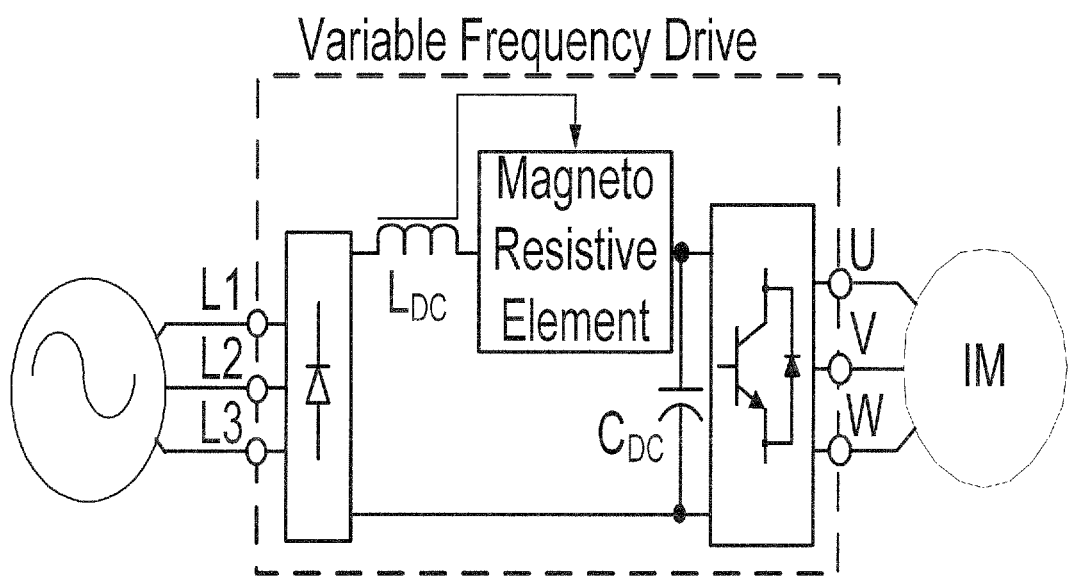
FIG. 3(b) is a generalized diagram of a magneto strict development used in the drive of FIG. 3(a)
Figure 3B:
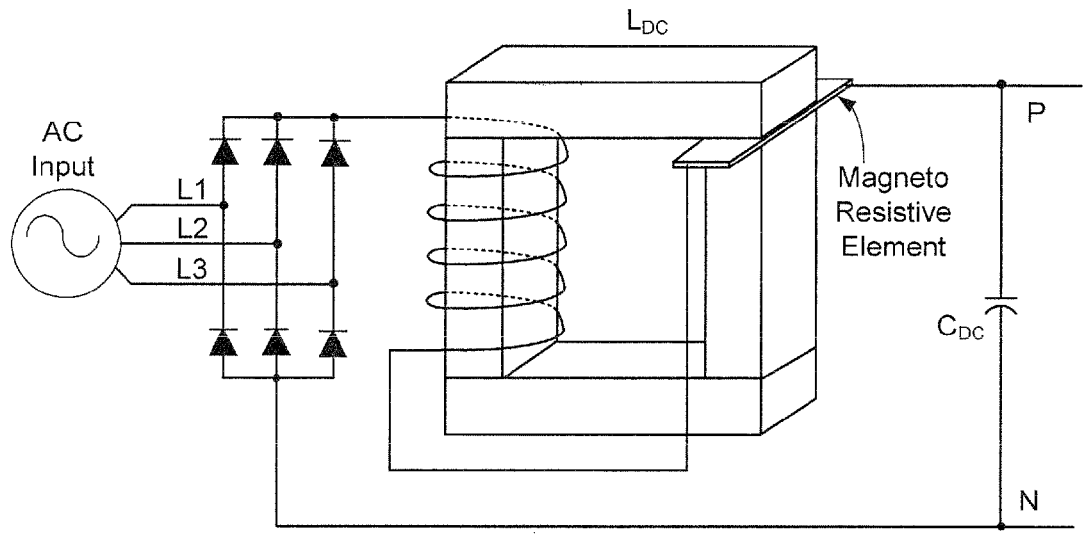
Figure 4:
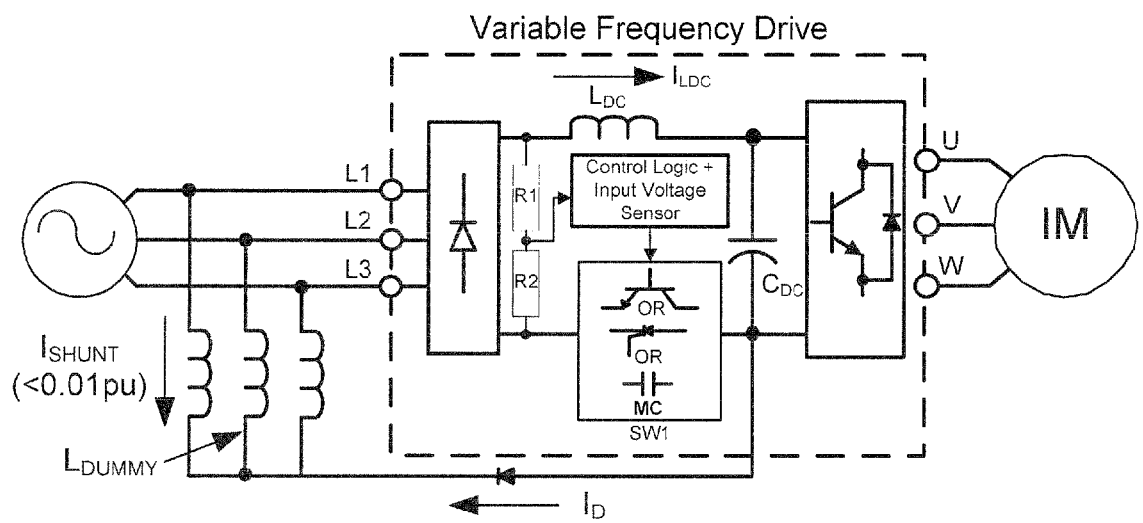
FIGS. 4 and 5 are generalized schematics of prior art variable frequency drives discussed above.
Figure 5:
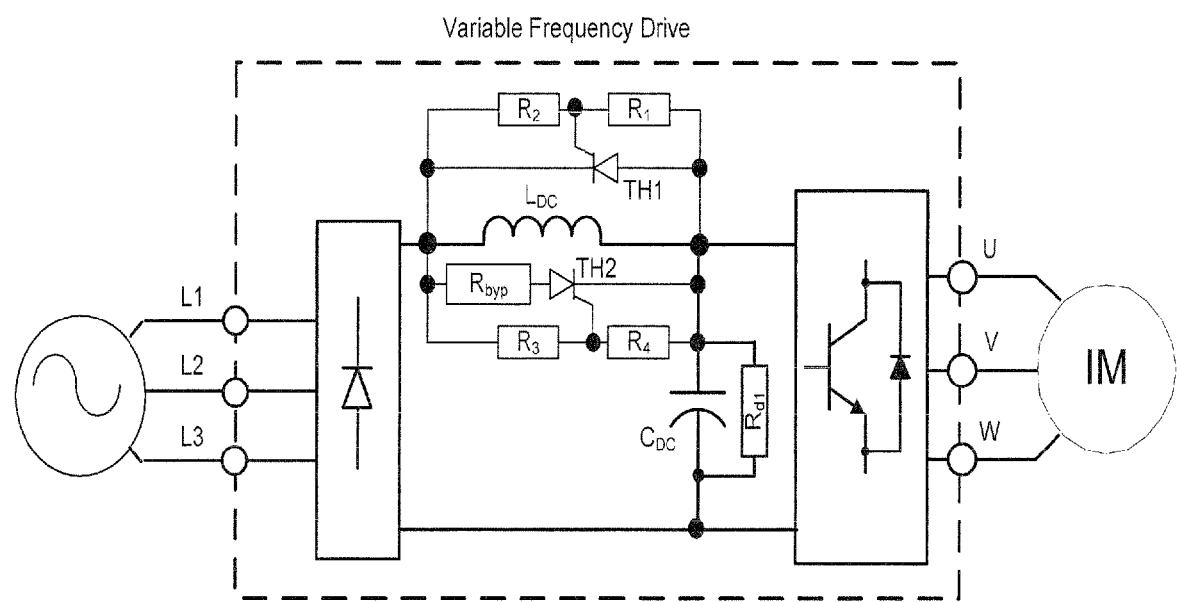
Figure 6:
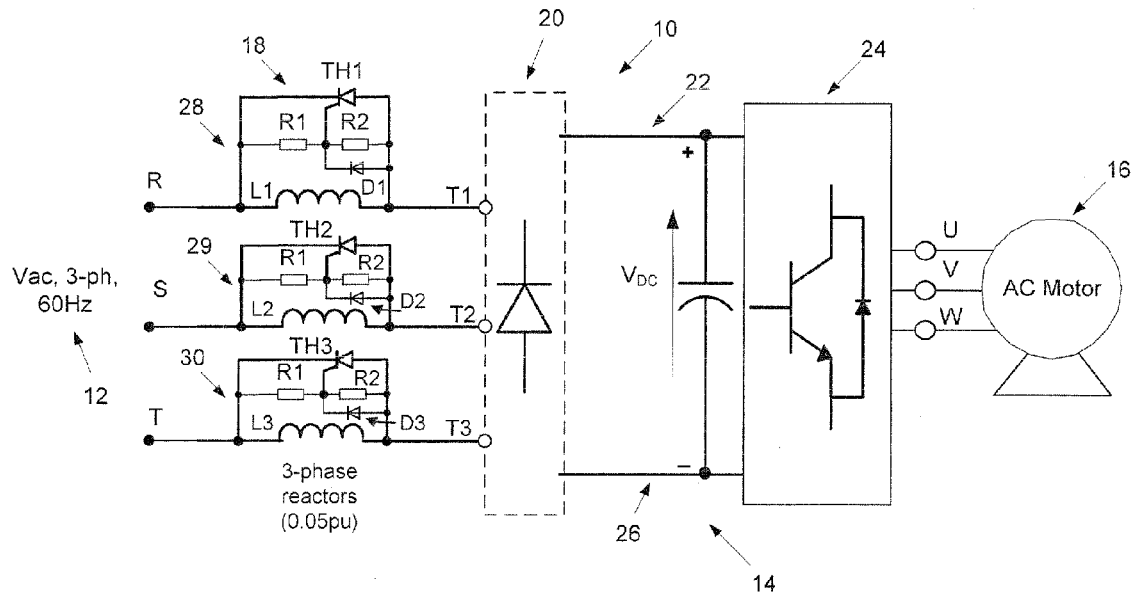
FIG. 6 is a schematic diagram of a variable frequency drive in accordance with the invention.

Referring particularly to FIG. 6, a motor drive system 10 is illustrated. The motor drive system 10 includes an AC source 12 and a variable frequency drive (VFD) 14 for driving an induction motor 16. As is known, a control unit (not shown) would be used for controlling the VFD 14. However, such control unit is not shown herein as it does not itself form part of the invention. Instead, the invention relates particularly to a soft charge circuit 18, described below.

The AC source 12 may comprise an alternate energy source or the like developing three phase AC power connected to input terminals labeled R, S and T. The VFD 14, as described more particularly below, converts the AC power to DC power and converts it back to AC power at a select frequency which is then impressed across terminals U, V and W. The terminals U, V and W are connected to feeder conductors to drive the motor 16, as is known.

The VFD 14 includes an AC/DC converter 20 connected by a DC link circuit 22 to a DC/AC converter 24. In an illustrative embodiment of the invention, the AC/DC converter 20 comprises a full wave bridge rectifier circuit of conventional construction which is operable to convert three phase AC power at input terminals T1, T2 and T3, to DC power at an output connected to the DC link circuit 22. Particularly, the AC/DC converter 20 comprises a diode rectifier. Other types of full wave bridge rectifier circuits may be used. The DC link circuit 22 comprises a DC bus 26 defined by rails labeled "plus" and "minus". A DC bus capacitor $C_{dC}$ is connected across the DC bus 26.

The DC/AC converter 24 comprises an inverter section. Typically, the inverter section comprises a pulse width modulation inverter using solid state switching devices connected in a three phase bridge configuration to the DC bus 26 to develop power at the terminals U, V and W. The switches are pulse width modulated by control signals using a conventional control scheme. Particularly, the PWM inverter 24 is controlled to create a sinusoidal effect for the induction motor 16. The pulse frequency is typically fixed. The pulse width is varied to various sinusoidal frequency.

As will be apparent, the soft charge circuit 18 is not limited to use with any particular AC/DC converter and/or DC/AC converter.

The soft charge circuit 18 comprises three input inductors L1, L2 and L3 each connected between the respective terminals R, S and T and rectifier input terminals T1, T2 and T3. Each of the input inductors L1, L2 and L3 includes an associated respective clamping circuit 28, 29 and 30. Each of the clamping circuits 28-30 are identical. The first clamping circuit 28 comprises an anti-parallel clamping thyristor TH1 connected across the input inductor L1. Series connected first and second resistors R1 and R2 are also connected across the inductor L1. A junction of the first and second resistors R1 and R2 is connected to a gate of the anti-parallel clamping thyristor TH1. A diode D1 is across the gate-cathode terminal of the anti-parallel clamping thyristor TH1. The other clamping circuits 29 and 30 are similar and are not described in detail herein.

When power is turned ON, at any given instant, depending on the largest line-line voltage, two of the rectifier diodes of the converter 20 associated with those phases will start conducting and charge the DC bus 26. It is observed that in all cases, one of the thyristors TH1, TH2 or TH3 across one of the respective input inductors L1, L2 or L3 is always forward biased and turns ON almost immediately after application of power. A resonant circuit is formed immediately comprising only one of the three input inductors L1 or L2 or L3 and the DC bus capacitor $C_{DC}$. Due to the L-C nature of the circuit, the following events occur:

1. DC bus voltage rises in a resonant manner.
2. The voltage across the particular input inductor, referred to generically below as L# (or just L in the equations), with # representing one of the numerals 1-3, also the resonating inductor, is equal to the instantaneous applied line-line voltage since the voltage across the DC bus capacitor is zero to begin. The voltage across the resonating inductor reduces in a sinusoidal manner from its peak value.
3. A resonant current flows through the resonating inductor L# and the resonating DC bus capacitor $C_{DC}$.

Eventually, the capacitor voltage increases beyond the applied voltage due to the resonant nature of the circuit. The voltage across the inductor L# goes through its natural zero and starts increasing in the opposite direction in a sinusoidal manner. The resonant current through the inductor capacitor combination reaches a peak value. The resonating current flows through two of the input diodes.

When the voltage across the resonant inductor L# reaches a sufficient value of negative voltage, the thyristor TH# placed across the inductor L# with the correct orientation as shown in FIG. 6, is turned ON. The turn ON process is facilitated by a voltage divider circuit as shown in FIG. 6. When the thyristor TH# turns ON, the voltage across the inductor L# is shorted and the energy stored in the inductor L# is dissipated as heat loss in the copper of the windings of the inductor and as core loss in the inductor. Some part of it is also dissipated as conduction loss in the thyristor TH#. The charging current that was charging the capacitor $C_{DC}$ and possibly increasing its voltage beyond a safe limit is diverted away from the capacitor $C_{DC}$ and circulates within the inductor-thyristor combination. The overcharging of the DC bus 26 is thus halted as current is bypassed immediately from the DC bus 26 and circulates around the loop formed by the inductor L# and the shorting thyristor TH#.

The charging pattern is determined by the value of the input inductor L# and the value of the DC bus capacitor $C_{DC}$. The sequence of operation as described in the numbered points above is expressed via equations next. It is assumed that the voltage across R and S phase, $V_{RS}$ has the highest line-line voltage at turn ON.

Figure 7:
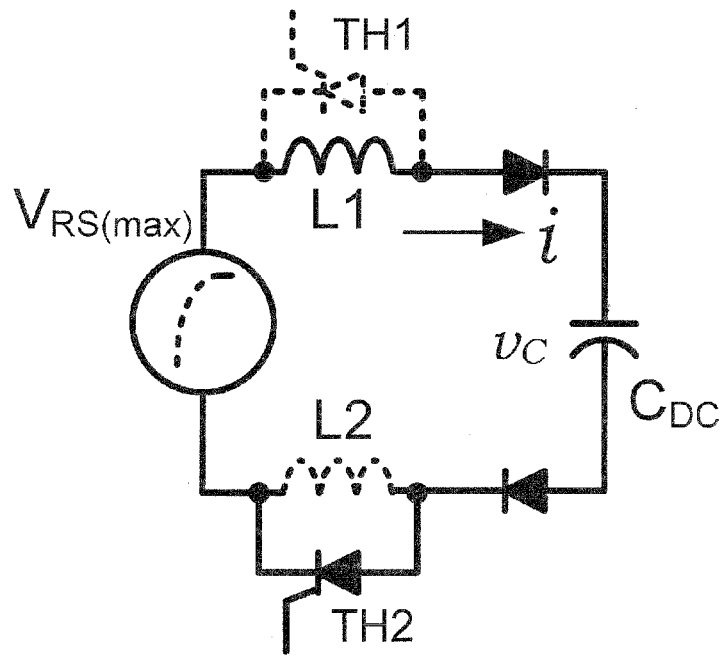
FIG. 7 is an equivalent circuit diagram for the drive of FIG. 6 during a first charging interval.

Interval 1 begins when the power is turned ON and the peak line-line voltage of $V_{RSmax}$ is applied to the inductor-capacitor combination. Interval 1 lasts till $v_c$ reaches a voltage equal to the applied peak line-line voltage ($V_{RSmax}$) plus voltage equal to the forward drop of two diodes plus a sufficient gate bias voltage to turn on thyristor TH1 in FIG. 6. The equivalent circuit for interval 1 is shown in FIG. 7.

The initial voltage across the DC bus capacitor $C_{DC}$ is assumed to be zero and the initial voltage across the input inductor L is $V_{RS(max)}$. The expression for current through the inductor-capacitor combination and the voltage across the inductor and across the capacitor for interval 1 is derived next.

$$i_L = \frac{V_{RS(max)}}{\sqrt{L/C_{DC}}} \sin(\omega_1 t); \quad \omega_1 = \frac{1}{\sqrt{L \cdot C_{DC}}} \quad (1)$$

$$v_C = V_{RS(max)} \cdot (1 - \cos(\omega_1 t)) \quad (2)$$

$$v_L = V_{RS(max)} \cos(\omega_1 t) \quad (3)$$

Figure 8:
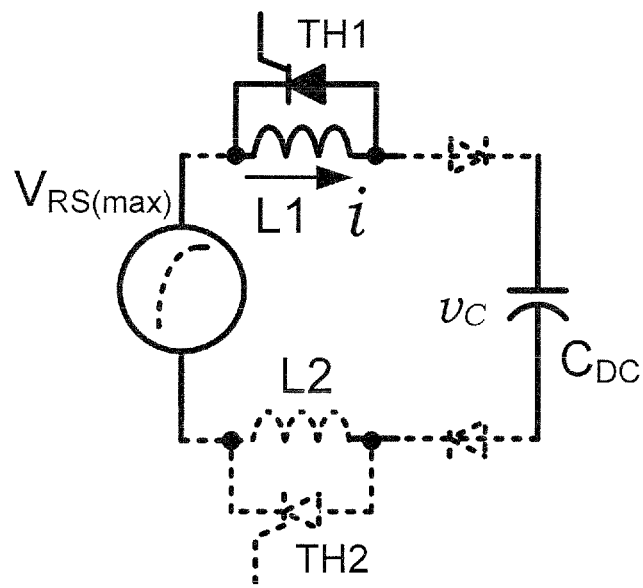
FIG. 8 is an equivalent circuit diagram for the drive of FIG. 6 during a second charging interval.

Interval 2 ($t_2$–$t_3$) begins when thyristor TH1 starts conducting. The voltage across the inductor gets clamped to VT and the dc bus capacitor $C_{DC}$ stops charging. The voltage across the capacitor is clamped to $V_{RS(max)}+2V_F+V_T$, where VF is the voltage across the input diodes and $V_T$ is the forward saturation voltage of thyristor TH1. The current through the inductor L1 decays in an exponential manner depending on the parasitic resistance of the inductor and thyristor combination. Interval 2 lasts until the current in L1 decays to zero. The equivalent circuit for interval 2 is shown in FIG. 8.

The voltage across the bus capacitor $C_{DC}$ is clamped to approximately the peak of the applied line-line voltage. The expression for current through the inductor-thyristor combination is derived below.

$$0 = L \cdot \frac{di}{dt} + i \cdot R_{par}; \quad (4)$$

$$i = \frac{V_{RS(max)}}{\sqrt{L/C_{DC}}} \cdot \left( e^{\frac{-R_{par}^t}{L}} \right) \quad (5)$$

$$i_{pk} = \frac{V_{RS(max)}}{\sqrt{L/C_{DC}}} \quad (6)$$

$$v_L = -V_T \quad (7)$$

$$v_C = V_{RS(max)} + (2 \cdot V_f) + V_T \quad (8)$$

Figure 9:
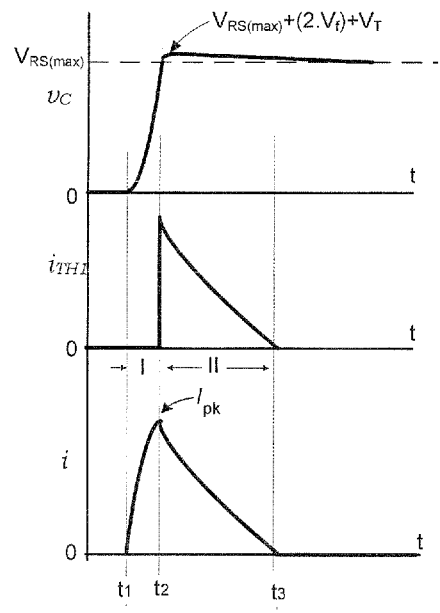
FIG. 9 is a graph illustrating theoretical wave forms for the drive of FIG. 6.

FIG. 9 shows theoretical waveforms in accordance with the operation of the soft charge circuit 18 discussed above.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. For example, other components may be added to, or removed from, the described systems. Other embodiments may be within the scope of the following claims.

The invention claimed is:

1. A voltage source inverter comprising:
   a rectifier having an input for connection to a multi phase AC power source and converting the AC power to DC power at an output;
   an inverter for receiving DC power and converting the DC power to AC power;
   a DC bus connected between the rectifier circuit and the inverter circuit to provide a relatively fixed DC voltage for the inverter, and a bus capacitor across the DC bus; and
   a soft charge circuit to limit inrush current to the bus capacitor, the soft charge circuit comprising an input inductor for each phase connected between the rectifier input and the AC power source and a clamping circuit across each input inductor to limit DC bus voltage.

2. The voltage source inverter of claim 1 wherein a resonant circuit is formed by one of the input inductors and the bus capacitor.

3. The voltage source inverter of claim 1 wherein flux in each input inductor resets every half cycle.

4. The voltage source inverter of claim 1 wherein each clamping circuit comprises an anti-parallel clamping thyristor connected across the input inductor.

5. The voltage source inverter of claim 4 wherein each clamping circuit further comprises series connected first and second resistors across the inductor and a junction of the first and second resistors connected to a gate of the anti-parallel clamping thyristor.

6. The voltage source inverter of claim 4 wherein each clamping circuit further comprises a diode across the gate-cathode terminal of the anti-parallel clamping thyristor.

7. The voltage source inverter of claim 1 wherein the rectifier circuit comprises a diode rectifier.

8. A variable frequency drive comprising:
   a diode rectifier receiving multi phase AC power from a source and converting the AC power to DC power;
   an inverter for receiving DC power and converting the DC power to AC power to drive a load;
   a DC bus connected between the diode rectifier and the inverter to provide a relatively fixed DC voltage for the inverter;
   a bus capacitor across the bus; and
   a soft charge circuit to limit inrush current to the bus capacitor, the soft charge circuit comprising an input inductor for each phase connected between the rectifier and the AC power source and a clamping circuit across each input inductor to limit DC bus voltage.

9. The variable frequency drive of claim 8 wherein a resonant circuit is formed by one of the input inductors and the bus capacitor.

10. The variable frequency drive of claim 8 wherein flux in each input inductor resets every half cycle.

11. The variable frequency drive of claim 8 wherein each clamping circuit comprises an anti-parallel clamping thyristor connected across the input inductor.

12. The variable frequency drive of claim 11 wherein each clamping circuit further comprises series connected first and second resistors across the inductor and a junction of the first and second resistors connected to a gate of the anti-parallel clamping thyristor.

13. The variable frequency drive of claim 11 wherein each clamping circuit further comprises a diode across the gate-cathode terminal of the anti-parallel clamping thyristor.

* * * * *